United States Patent
Huehsam et al.

(10) Patent No.: US 7,002,279 B1
(45) Date of Patent: Feb. 21, 2006

(54) ARMATURE SHAFT FOR AN ELECTRICAL MACHINE

(75) Inventors: Andreas Huehsam, Karlsruhe (DE);
Christian Schrempp, Renchen (DE);
Martin Boschert, Oberkirch (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/933,469

(22) Filed: Sep. 3, 2004

(30) Foreign Application Priority Data

Aug. 12, 2004 (DE) .................. 20 2004 012 704 U

(51) Int. Cl.
*H02K 15/02* (2006.01)
*F16B 9/00* (2006.01)

(52) U.S. Cl. .................. 310/261; 403/359.6; 310/42; 310/217

(58) Field of Classification Search .................. 310/42, 310/91, 217, 261; 403/359.1, 359.6
See application file for complete search history.

(56) References Cited

U.S. PATENT DOCUMENTS

| | | | | |
|---|---|---|---|---|
| 2,297,390 A | * | 9/1942 | Burger .................. | 403/350 |
| 3,238,319 A | * | 3/1966 | Godel et al. .................. | 200/11 B |
| 3,360,961 A | * | 1/1968 | Steiner .................. | 464/158 |
| 3,477,125 A | * | 11/1969 | Schwartz .................. | 29/596 |
| 4,215,287 A | * | 7/1980 | Otto .................. | 310/217 |
| 4,376,333 A | * | 3/1983 | Kanamaru et al. .................. | 29/432 |
| 4,833,353 A | * | 5/1989 | Hansen .................. | 310/51 |
| 5,032,036 A | * | 7/1991 | Murakami et al. .................. | 403/282 |
| 5,907,208 A | * | 5/1999 | Kristen et al. .................. | 310/261 |
| 6,075,306 A | * | 6/2000 | Mosciatti .................. | 310/261 |
| 6,081,052 A | * | 6/2000 | Hosoe et al. .................. | 310/42 |
| 6,198,185 B1 | * | 3/2001 | Bruhn et al. .................. | 310/68 B |
| 6,803,695 B1 | * | 10/2004 | Yamamoto et al. .................. | 310/261 |
| 6,883,997 B1 | * | 4/2005 | Ruschmann et al. .................. | 403/279 |
| 6,909,213 B1 | * | 6/2005 | Frey et al. .................. | 310/77 |

FOREIGN PATENT DOCUMENTS

| | | | |
|---|---|---|---|
| DE | 3615230 | * | 11/1987 |
| JP | 9-191591 | * | 7/1997 |
| JP | 2002257149 A | * | 11/2002 |

* cited by examiner

*Primary Examiner*—Burton Mullins
(74) *Attorney, Agent, or Firm*—Ronald E. Greigg

(57) ABSTRACT

An armature shaft for an electrical machine having a plurality of notches, extending along the circumference of the armature shaft essentially parallel to the longitudinal direction of the armature shaft, which notches form a notching heap. At least the notching heaps form acute angles whereby the imbalance of the armature directly after the shafts have been press-fitted into the lamination packet is reduced markedly. Moreover, the structure-borne sound of the motors is reduced compared to motors with stamped-out armature packets.

20 Claims, 1 Drawing Sheet

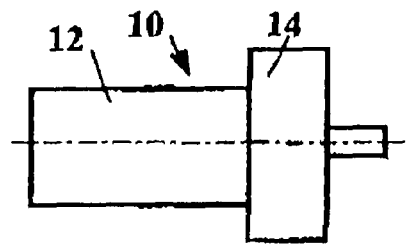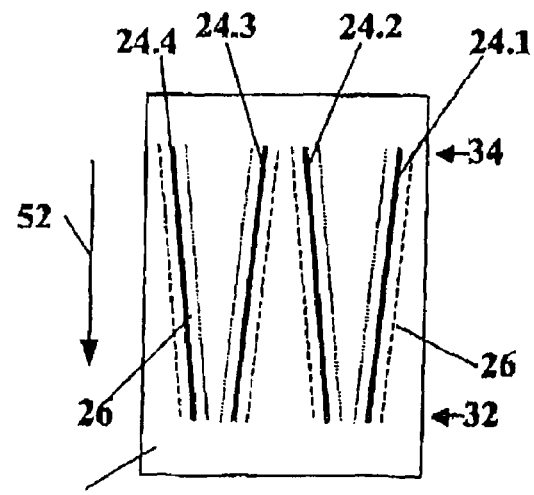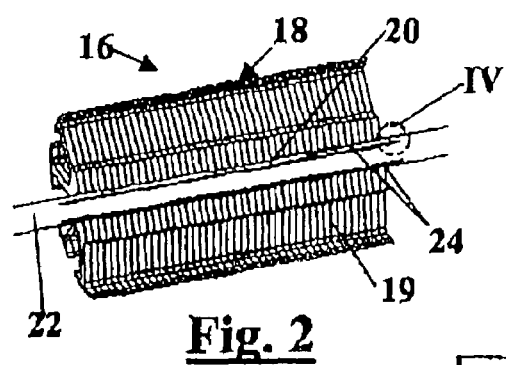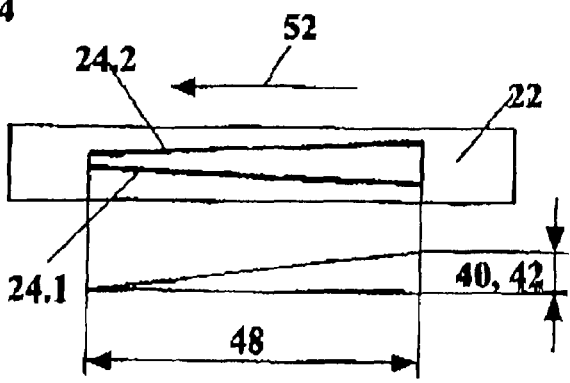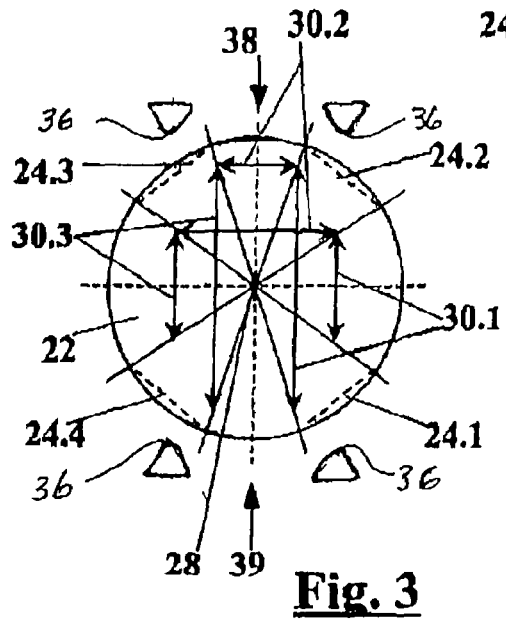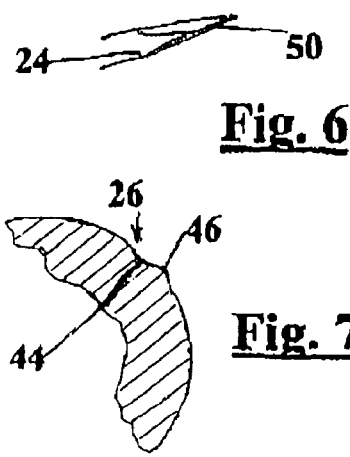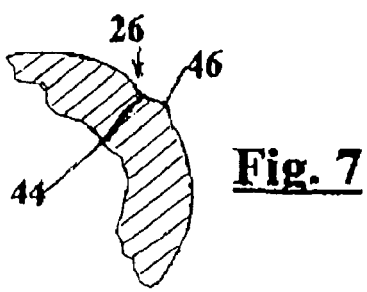

ARMATURE SHAFT FOR AN ELECTRICAL MACHINE

BACKGROUND OF THE INVENTION

1. Field of the Invention

The invention is based on an armature shaft for an electrical machine having a plurality of notches, which extend along the circumference of the armature shaft essentially parallel to the longitudinal direction and form a notching heap.

2. Description of the Prior Art

In packet-making by means of notches, two notches each extending longitudinally are made in the armature shaft with a two-piece, U-shaped tool. The notching creates a heap or ridge of displaced material, which increases the outer diameter of the armature shaft in the notched region. As a result, the armature shaft can be firmly press-fitted into the bore in the packet. The notching heap joins each lamination in the packet solidly to the armature shaft. Moreover, because the notching heap slightly penetrates the laminations, a positive engagement is achieved which markedly increases the torques of the packet. The axial displacement force of the packet, however, is usually slight, above all at the end laminations, and these laminations must therefore as a rule also be ring-calked. By means of notches, an extremely stable connection is created, which meets the most stringent demands in terms of the quality of the balancing and low-vibration operation. Thus very low-noise motors can be produced. However, complicated technical production prerequisites must be met, if the method is to be used at all with long, thin shafts.

In production, bore tolerances, for instance, selected must be close. The heaps of the notches must likewise have close tolerances; otherwise, the press-fitting forces exceed the buckling force of the shaft. Because of the close tolerances, introducing the shaft is difficult. A high rejection rate must be expected, because of cold welding of shaft material to the packet sheet metal. Especially long packets, with a length of about 50 mm, for instance, have a particularly pronounced tendency to cold welding because of the long press-fitting distances. Because of the relatively high press-fitting forces, excessively great errors of concentricity often occur at the shaft upon press-fitting and must then be corrected manually or by machine in a further operation. Packet-making by press-fitting a notched shaft is indeed the appropriate method for producing low-noise motors that are relatively impact-resistant. However, they require considerable effort and expense technically. Rejections from buckling of the shaft after seizing are highly likely in the press-fitting process.

Notches with a notching heap are in contrast to knurling, in which no notching heaps are created, or only indentations are created because of compaction of the material. This makes knurling unsuitable for an armature shaft to which an armature packet is to be secured.

OBJECT AND SUMMARY OF THE INVENTION

The object of the invention is to markedly minimize the high rejection rates in packet-making with a notched, long and thin shaft (for instance, 150 mm long with a 4 mm diameter) and a greater packet length. Moreover, the high structure-borne sound values of small motors, especially small power window motors, are to be reduced markedly.

By means of the armature shaft of the invention for an electrical machine the advantage has been attained that the imbalance of the armature directly after the shafts are press-fitted into the lamination packet is reduced markedly. Moreover, the structure-borne sound of motors is reduced by 8 dBR compared to motors with stamped-out armature packets. For this purpose, an armature shaft for an electrical machine is provided that has a plurality of notches, which extend along the circumference of the armature shaft essentially parallel to its longitudinal direction and form a notching heap; the notches and the notching heaps form acute angles relative to one another.

The acute angle can be formed such that adjacent notching heaps each form an angle of 1° to 5°, as a result of which each lamination is securely held.

The acute angle can furthermore be formed by providing that the depth of the notches on one end is greater than on the other end, and that the height of the notching heap on one end is greater than the other end, so that the bottom of the notch and the spine of the notch form the acute angle. The result is a conical course along the shaft, which has a positive effect on the press-fitting process. Preferably, the notch base has a slope of 0.01 mm over 50 mm of length.

The acute angle can also be formed by providing that only the tail ends of the notches are arrowhead-shaped, creating a chamfer on the notching heap that prevents chips from forming in the press-fitting process, because chips in the interstice between the shaft and the notch are the primary cause of seizing.

The armature shaft with the notches can be produced more precisely and in only one operation if the notching heaps extend on only one side of the notches. In this respect it is also advantageous that the notching heaps of adjacent notches are oriented toward or away from one another, which additionally makes easier visual monitoring possible.

Because the notching heaps are rounded, they are not sharp, and thus the tendency to chip development is reduced.

Preferably, the pitch of the notches varies over the circumference in the longitudinal direction, and as a result all the sheet-metal laminations have a defined contact with the armature shaft. This is assured especially well in that a first, second, third and fourth notch are provided; that the first notch and the second notch form an angle with respect to the center axis of the armature shaft, and the angle is smaller than 90° on one end of the notches and larger than 90° on the other end; that the second notch and the third notch form an angle with respect to the center axis of the armature shaft, and the angle is smaller than 90° on one end of the notches and larger than 90° on the other end; that the third notch and the fourth notch form an angle with respect to the center axis of the armature shaft, and the angle is smaller than 90° on one end of the notches and larger than 90° on the other end; and that the larger angle is preferably about 91°, and the smaller angle is preferably about 89°.

An armature with an armature packet and with an armature shaft of this kind has only very little imbalance. An electrical machine with such an armature has reduced structure-borne sound. This is advantageous especially in the passenger compartment of a passenger car.

BRIEF DESCRIPTION OF THE DRAWINGS

The invention will be better understood and further objects and advantages thereof will become more apparent from the ensuing detailed description of a preferred embodiment, taken in conjunction with the drawings, in which:

FIG. 1 is a side view of an electrical drive unit;

FIG. 2 shows an armature with a partial section;

FIG. 3 shows the armature shaft in an end-on view;

FIG. 4 shows the armature shaft in a developed view;

FIG. 5 shows the armature shaft in a side view;

FIG. 6 shows a tail end of a notch marked as detail IV in FIG. 2; and

FIG. 7 is a fragmentary sectional view of the armature shaft with a notch.

DESCRIPTION OF THE PREFERRED EMBODIMENT

In FIG. 1, an electrical machine or drive unit 10 is shown, which is preferably used in a motor vehicle. The drive unit 10 may be a power window raiser, a sunroof drive mechanism, a power train actuator, in particular clutch actuator, a seat adjuster, or the like. The drive unit 10 includes an electric motor 12 and may additionally include a gear 14; it may also be an electrical machine with brushes or a brushless electrical machine or an electronically commutated electrical machine.

In FIG. 2, the armature 16 of the electrical machine 10 is shown in a partial section showing only one half of the armature packet 18. The armature packet 18 is produced from stamped-out packeted laminations 19. For the sake of greater clarity, the winding is not shown. The armature packet 18 is slipped with a central bore 20 onto the armature shaft 22.

As already indicated in FIG. 2, the armature shaft 22 has a plurality of notches 24, extending along the circumference of the armature shaft 22 essentially parallel to its longitudinal direction. Forming the notches 24 displaces material, forming a notching heap 26 (FIG. 7). As a result, the diameter is partially increased at the places where the notching heap is, creating a press fit when the armature shaft 22 is inserted. Instead of the term notching heap 26, this can be called an accumulation of material.

As seen more clearly in FIGS. 3 and 4, a first, second, third and fourth notch 24.1, 24.2, 24.3 and 24.4 are provided. The first notch 24.1 and the second notch 24.2 form an angle 30.1 with respect to the center axis 28 of the armature shaft 22. The angle 30.1 is smaller than 90° on one end 32 of the notches 24.1, 24.2 and larger than 90° on the other end 34. The second notch 24.2 and the third notch 24.3 form an angle 30.2 with respect to the center axis 28 of the armature shaft 22. The angle 30.2 is smaller than 90° on one end 32 of the notches 24.2, 24.3 and larger than 90° on the other end 34. The third notch 24.3 and the fourth notch 24.4 form an angle 30.3 with respect to the center axis 28 of the armature shaft 22. The angle 30.3 is smaller than 90° on one end 32 of the notches 24.3, 24.4 and larger than 90° on the other end 34. For the sake of greater clarity the angles 30 in FIGS. 3 and 4 are shown greatly exaggerated. Normally, the oblique course of the notches 24 may be only poorly apparent to the eye under some circumstances. Preferably, the smaller size of the angle 30.1, 30.2, 30.3 is about 89°, and the larger size is preferably about 91°, including production-dictated tolerances. The production-dictated tolerances have the effect that the angles 30.1, 30.2, 30.3 can range within a bandwidth of approximately 89.5° to 90.5°, and in this bandwidth, production-dictated deviations of a few angle minutes can occur. In its course, the angle ranges from 85° to 95°, and once again production-dictated deviations of a few minutes of angle or even degrees of angle can occur. In general terms, the pitch of the notches 24 varies over the circumference in the longitudinal direction of the armature shaft 22. Naturally, a different number of notches 24 may be provided, for instance 2, 3, 5, 6, 7, 8, 9, 10, 11, 12 of them, and so forth.

Because of the described course of the notches 24 and notching heaps 26, acute angles are formed, which make it easier to fit the armature shaft 22 into the bore 20 and improve the hold of the armature packet 18 on the shaft. The acute angle formed by the respective adjacent notches 24 and notching heaps 26 at the circumference of the armature shaft 22 is preferably within a range from 1° to 5°.

In FIG. 3, four notch edges 36 of a notching tool are also shown symbolically, along with two arrows 38, 39, pointing toward one another, that indicate the direction from which the edges 36 are pressed against the armature shaft 22. In this way, as FIG. 7 shows, the result is that the notching heaps 26 extend on only one side of the notches 24. It can also be seen from FIG. 7 that the notching heaps 26 are rounded. This can be done by rounding of the edges 36. The result is moreover an apparatus for producing the notches 24 of the armature shaft 22, and this apparatus has four notch edges 36 which can be moved in only two directions 38, 39 along the armature shaft 22 and create notches 24 in the shaft 22 that are essentially offset from one another by 90°. As a result, the apparatus is simple in design yet makes it possible to produce the notches 24 and notching heaps 26 within close tolerances.

In the developed view of FIG. 4, dashed lines indicate the notching heaps 26 when the edges 36, as shown in FIG. 3, are pressed against the armature shaft 22. Dotted lines also indicate notching heaps 26 that result when the edges are rotated by 90° about the center axis 28 and pressed against the armature shaft 22. The direct result is that the notching heaps 26 of adjacent notches 24 are either oriented toward one another or away from one another.

In the production of the notches 24 and notching heaps 26, the tool edges 36 do not press in a direct line toward the center axis 28 but rather at an angle of about 45°, resulting in the formation, described above, of the notching heaps 26 on only one side of the notch 24.

In FIG. 5, a further possible way of forming an acute angle is shown. The depth 40 of the notches 24 is greater on one end 32 than on the other end 34. As a result, the height 42 of the notching heap 26 is greater on the end 34 than on the end 32. Since the depth 40 corresponds to the height 42, both are shown together in the overview of FIG. 5. As a result, the notch base 44 and the notch spine 46 (FIG. 7) form the acute angle. It suffices if only the notch spine 46 increases in height, since the result is a partial conicity of the shaft. However, production is simpler as a result of the notches 24. Preferably, the notch base 44 has a gradient and the notch spine 46 a slope of about 0.01 mm over 50 mm of the length 48 of the notch, including production-dictated deviations of a few percent.

A further possible way of forming an acute angle is also shown in FIG. 6. Here, the tail ends 50 at the ends 32, 34 of the notches 24 are arrowhead-shaped. As a result, chamfers are formed at the tail ends 50 of the notch spines 46. Because chip formation is avoided, production is once again made easier. This characteristic may also be provided for an armature shaft 22 for electrical machines 10 with a plurality of notches, extending over the circumference of the armature shaft 22 essentially parallel to its longitudinal direction, that form a notching heap 26, and in which the tail ends at the ends of the notch spines form a chamfer.

After the notches 24 and notching heaps 26 have been produced, the shaft 22 is press-fitted into the armature packet 18 in the inward press-fitting directions 52 represented by arrows in FIGS. 4 and 5. In the process, the height of the notching heaps 26 increases counter to the inward press-fitting direction 52.

The armature shaft 22 is preferably hardened on only its outer or end regions, where it will later also be supported. In the region of the notches 24, however, it is unhardened.

The provisions for forming the acute angles could be performed separately, since they have advantages separately. Combining them, however, gives the best results in terms of feasibility and in terms of the structure-borne sound of the finished motors.

The foregoing relates to a preferred exemplary embodiment of the invention, it being understood that other variants and embodiments thereof are possible within the spirit and scope of the invention, the latter being defined by the appended claims.

We claim:

1. An armature shaft (22) for an electrical machine (10), having a plurality of notches (24), extending along the circumference of the armature shaft essentially parallel to the longitudinal direction of the armature shaft (22), which form a notching heap (26), at least the notching heaps (26) form acute angles relative to the longitudinal direction of the armature shaft (22).

2. The armature shaft (22) in accordance with claim 1, the acute angle is formed as a result of the fact that adjacent notching heaps (26) each form an angle of preferably 10 to 5° relative to the longitudinal direction of the armature shaft (22).

3. The armature shaft (22) in accordance with claim 1, the acute angle is formed as a result of the fact that the depth (40) of the notches (24) is greater on one end (32) than on the other end (34), and that the height (42) of the notching heap (26) is greater on one end (32) than on the other end (34), so that the notch base (44) and the notch spine (46) of a notch (24) form the acute angle.

4. The armature shaft (22) in accordance with claim 2, the acute angle is formed as a result of the fact that the depth (40) of the notches (24) is greater on one end (32) than on the other end (34), and that the height (42) of the notching heap (26) is greater on one end (32) than on the other end (34), so that the notch base (44) and the notch spine (46) of a notch (24) form the acute angle.

5. The armature shaft (22) in accordance with claim 1, wherein the notch base (46) has a slope of about 0.01 mm over 50 mm in length.

6. The armature shaft (22) in accordance with claim 3, wherein the notch base (46) has a slope of about 0.01 mm over 50 mm in length.

7. The armature shaft (22) in accordance with claim 1, wherein the acute angle is formed as a result of the fact that the tail ends (50) of the notches (24) are arrowhead-shaped.

8. The armature shaft (22) in accordance with claim 1, wherein the notching heaps (26) extend on only one side of the notches (24).

9. The armature shaft (22) in accordance with claim 3, wherein the notching heaps (26) extend on only one side of the notches (24).

10. The armature shaft (22) in accordance with claim 1, wherein the notching heaps (26) are rounded.

11. The armature shaft (22) in accordance with claim 8, wherein the notching heaps (26) are rounded.

12. The armature shaft (22) in accordance with claim 1, wherein the notching heaps (26) of adjacent notches (24) are each oriented toward or away from one another.

13. The armature shaft (22) in accordance with claim 3, wherein the notching heaps (26) of adjacent notches (24) are each oriented toward or away from one another.

14. The armature shaft (22) in accordance with claim 1, wherein the pitch of the notches (24), viewed over the circumference, varies in the longitudinal direction.

15. The armature shaft (22) in accordance with claim 3, wherein the pitch of the notches (24), viewed over the circumference, varies in the longitudinal direction.

16. The armature shaft in accordance with claim 1, wherein the plurality of notches include a first, second, third and fourth notch (24.1, 24.2, 24.3 and 24.4), the first notch (24.1) and the second notch (24.2) forming an angle (30.1) with respect to the center axis (28) of the armature shaft (22), the angle (30.1) being smaller than 90° on one end (32) of the notches (24.1, 24.2) and larger than 90° on the other end (34), the second notch (24.2) and the third notch (24.3) forming an angle (30.2) with respect to the center axis (28) of the armature shaft (22), the angle (30.2) being smaller than 90° on one end (32) of the notches (24.2, 24.3) and larger than 90° on the other end (34), the third notch (24.3) and the fourth notch (24.4) forming an angle (30.3) with respect to the center axis (28) of the armature shaft (22), the angle (30.3) being smaller than 90° on one end (32) of the notches (24.3, 24.4) and larger than 90° on the other end (34), the larger size of the angle (30.1, 30.2, 30.3) being preferably about 91°, and the smaller size of the angle (30.1, 30.2, 30.3) being preferably about 89°.

17. The armature shaft in accordance with claim 3, wherein the plurality of notches include a first, second, third and fourth notch (24.1, 24.2, 24.3 and 24.4), the first notch (24.1) and the second notch (24.2) forming an angle (30.1) with respect to the center axis (28) of the armature shaft (22), the angle (30.1) being smaller than 90° on one end (32) of the notches (24.1, 24.2) and larger than 90° on the other end (34), the second notch (24.2) and the third notch (24.3) forming an angle (30.2) with respect to the center axis (28) of the armature shaft (22), the angle (30.2) being smaller than 90° on one end (32) of the notches (24.2, 24.3) and larger than 90° on the other end (34), the third notch (24.3) and the fourth notch (24.4) forming an angle (30.3) with respect to the center axis (28) of the armature shaft (22), the angle (30.3) being smaller than 90° on one end (32) of the notches (24.3, 24.4) and larger than 90° on the other end (34), the larger size of the angle (30.1, 30.2, 30.3) being preferably about 91°, and the smaller size of the angle (30.1, 30.2, 30.3) being preferably about 89°.

18. An armature (16) having an armature packet (18) and having an armature shaft (22) in accordance with claim 1.

19. An apparatus for producing the notches (24) of an armature shaft (22) in accordance with claim 1, the apparatus having four notch edges (36), which can be traveled along the armature shaft (22) in only two directions (38, 39) and impress notches into the shaft that are offset from one another essentially by 90°.

20. An electrical machine (10) having an armature (16) in accordance with claim 18.

* * * * *